April 18, 1961 F. R. ROGERS 2,980,174

FUEL CONTROL FOR GAS TURBINE ENGINE

Filed Dec. 15, 1955

TIME

INVENTOR.
FRANCIS R. ROGERS
BY
*R. G. Brodahl*
ATTORNEY

2,980,174
Patented Apr. 18, 1961

United States Patent Office

2,980,174

FUEL CONTROL FOR GAS TURBINE ENGINE

Francis R. Rogers, South Bend, Ind., assignor to The Bendix Corporation, a corporation of Delaware Filed Dec. 15, 1955, Ser. No. 553,316

6 Claims. (Cl. 158—36.3)

This invention relates to a gas turbine engine and more particularly to a fuel control apparatus or means for controlling the flow of fuel to a gas turbine engine.

It is an object of the present invention to provide an improved fuel control apparatus for a gas turbine engine.

It is another object of the present invention to provide an improved afterburner fuel control for the supply of afterburner fuel to the afterburner fuel nozzles of a gas turbine engine.

It is a different object to provide an improved fuel control which controls fuel to the engine as a function of both throttle position or schedule and the speed of the engine.

It is a further object to provide an improved fuel control apparatus for a gas turbine engine which apparatus includes a speed lock-out feature whereby the engine speed controls the initiation of fuel flow to the engine and thereafter the engine speed is not the governing control of the fuel flow.

It is an additional object of the present invention to provide an improved fuel control device which responds to speed of the engine and to the position of a control throttle member, whereby the throttle member requests fuel flow to the engine but the actual flow of fuel to the engine occurs when the engine speed reaches a predetermined value.

It is still another object of the present invention to provide an improved fuel control device which responds to engine speed and to throttle position, which device is operative such that the throttle position is operative to request fuel flow to the engine but the actual fuel flow does not start until the engine speed reaches a predetermined value and thereafter in this regard the fuel control device is responsive to throttle position and not to engine speed.

It is a still different object of the present invention to provide an improved fuel control apparatus for a gas turbine engine which apparatus responds to engine speed and to throttle position such that the throttle is operative to initially schedule fuel flow to the engine but the actual flow does not occur until the engine speed reaches a predetermined value, which predetermined value is adjustable such that the engine speed at which fuel flow actually occurs can be thereby varied.

Figure 1:
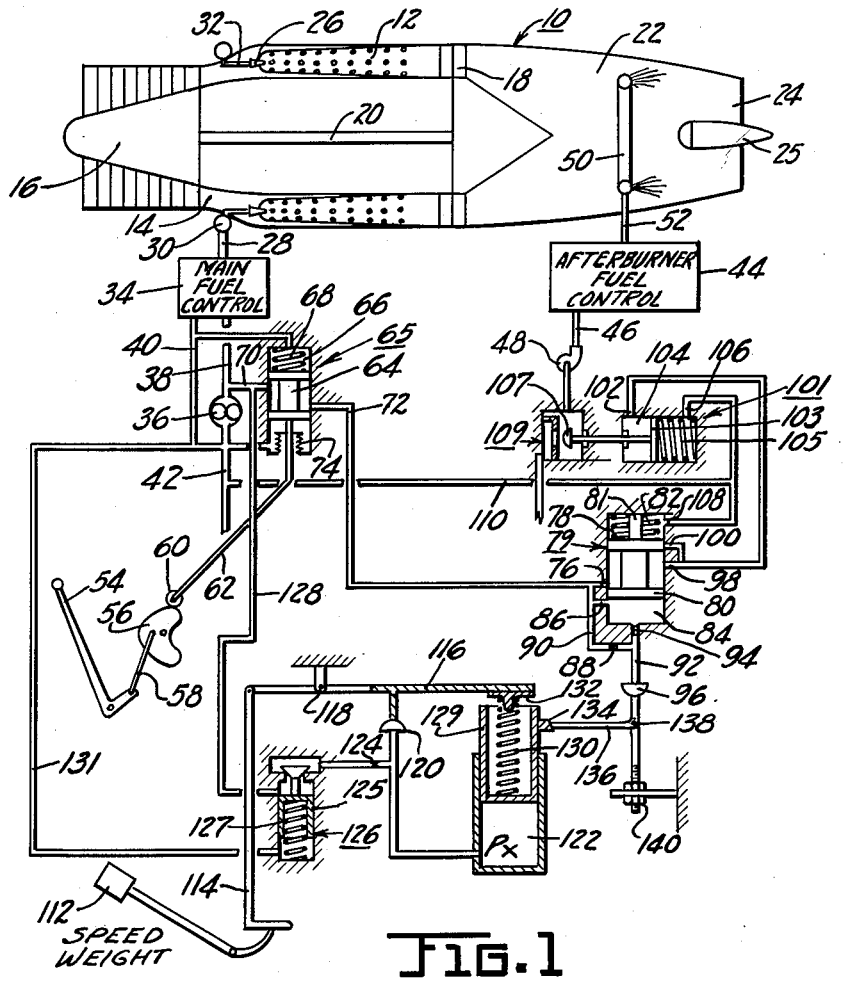
Figure 2:
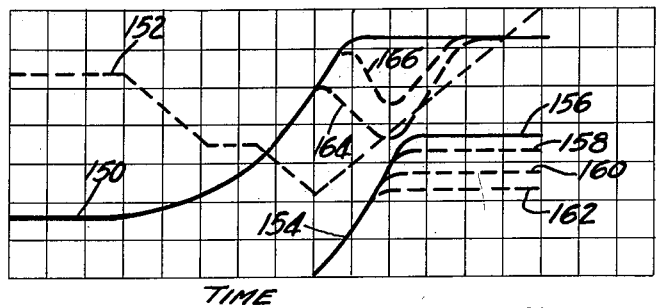

These and other objects and advantages of the present invention will become apparent in view of the following description taken in conjunction with the drawings wherein:

Figure 1 is a schematic view of a gas turbine engine equipped with the fuel control apparatus in accordance with the present invention; and Figure 2 is a curve or graph illustrating the operation of the gas turbine engine when controlled by the fuel control apparatus of the present invention.

Referring to Figure 1 there is shown a gas turbine engine 10 which includes a series of annularly disposed combustion chambers 12 mounted in a casing having a header or air intake section 14 and a compressor 16 which is driven by means of a turbine unit 18 through a drive shaft 20. The engine has an elongated tailpipe 22 that receives the hot gases of combustion which flow through the turbine 18 and conducts the gases to an exhaust nozzle 24 which discharges into the atmosphere. Each of the combustion chambers 12 is provided with a burner nozzle 26 to which metered fuel is supplied under pressure by way of a conduit 28, a main fuel manifold 30 and individual fuel lines 32. The fuel conduit 28 receives metered fuel from a main fuel control device 34 which is preferably of the type disclosed in the copending application Serial No. 499,432, filed April 5, 1955, in the names of H. J. Williams, F. R. Rogers and B. J. Ryder and assigned to the same assignee as the present invention.

A main fuel pump 36 supplies fuel under pressure to the main fuel control 34 through a conduit 38 a portion of which fuel may be by-passed back to the inlet of the main fuel pump 36 through a conduit 40 to the inlet conduit 42 of the main fuel pump 36.

An afterburner fuel control device 44 receives fuel under pressure through an inlet conduit 46 from a centrifugal type afterburner fuel pump 48. The afterburner fuel control device 44 is operative to meter afterburner fuel to an afterburner fuel manifold 50 through a manifold fuel supply conduit 52. A control throttle member 54 is provided for the manual control of the gas turbine engine 10 by the aircraft pilot, which control throttle member is mechanically connected to a throttle cam 56 through a suitable linkage arm 58. A cam follower 60 for the throttle cam 56 is connected through a linkage arm 62 to one end of a shuttle valve member 64 of a first control valve 65. The shuttle valve member 64 is movable within a fuel chamber 66 by means of the linkage arm 62 against the force of a compression spring member 68. An inlet passage 70 and an outlet passage 72 are connected to the fluid chamber 66. The inlet passage 70 is connected to the outlet fuel conduit 38 of the main fuel pump 36. A conventional fluid seal bellows member 74 is connected between the lower end of the fuel chamber 66 and the linkage arm 62. The outlet fluid conduit 72 is connected to an inlet fluid conduit 76 of a second fluid chamber 78 of a second control valve 79. A second shuttle valve member 80 is operable within the second fluid chamber 78 against the force of a compression spring 82 and operated by the fluid pressure within the pressure chamber 84 at the lower end of the fluid chamber 78. A limit stop 81 is provided in chamber 78 to limit the upward movement of piston 80 to the position shown in Figure 1. An inlet conduit 86 is connected to the pressure chamber 84. A servo orifice 88 is connected in a fuel conduit 90 connected between the inlet conduit 76 and a servo chamber 92. A control bleed 94 is connected between the control pressure chamber 84 and the servo chamber 92. A half-ball or servo pilot valve 96 controls the fluid pressure within the servo chamber 92 and the pressure chamber 84. An outlet conduit 98 is connected to the fluid chamber 78 with a branch outlet conduit 100 being likewise connected to the fluid chamber 78 and spaced from the outlet conduit 98. The outlet conduit 98 is connected to an inlet passage 102 of a control fluid chamber 104 of a third control valve 101. A second inlet passage 106 is connected to the fluid chamber 104 and connected to an inlet passage 108 leading to the upper portion of the fluid chamber 78. The inlet passages 106 and 108 are connected through a fluid passage 110 to the inlet fuel conduit 42 of the main fuel pump 36. A piston member 103 is operative against the force of a compression spring 105 to control the position of a control valve member 107 of a control valve 109.

A speed sensitive weight 112 is operatively connected to the drive shaft 20 of the gas turbine engine 10 as well known in this art such that the speed weight 112 is responsive to the actual rotational speed of the gas turbine engine. The output of the speed weight 112 is connected through a connecting arm 114 to one end of a control lever 116, which control lever 116 is pivoted about connection point 118. The control lever 116 is operatively connected to a servo control valve 120 which controls the fuel pressure within a fuel chamber 122 and is supplied fuel at servo pressure $P_x$ through a servo bleed orifice 124 from a servo pressure regulator valve 126 which provides control fuel at pressure $P_R$ fom the fuel at pressure $P_1$ in the outlet conduit 38 of the main fuel pump 36 through a connecting fuel conduit 128. The servo pressure regulator valve includes a piston member 125 which acts against a compression spring 127 and fluid at pressure $P_0$ provided by conduit 131 connected to the inlet conduit 42 of the main fuel pump 36. The control fuel at servo pressure $P_x$ as controlled by the servo half-ball 120 controls the position of a speed piston member 129 by providing a force proportional to the pressure of the fluid within the control chamber 122 which acts against the output force of a compression spring 130 that is connected between the speed piston 129 and a connecting member 132 fastened to the control lever 116. The speed piston includes a cam surface 134 which is operative through a cam follower member 136 to control the position of the servo control valve 96 for the second control fuel chamber 78. The cam follower arm 136 is pivoted about pivot connection 138 which in turn is adjustable in position by the support connection 140.

The afterburner fuel control apparatus 44 may be of the type disclosed in copending application Serial No. 520,722, filed July 8, 1955, in the name of H. J. Williams and assigned to the same assignee as the present invention.

Referring to Figure 2 there is shown an engine speed curve 150 which illustrates the operative engine speed from the low idle value to the maximum operative value as a function of time. A nozzle area curve 152 illustrates the positioning of the exhaust nozzle member 25 to control the effective outlet exhaust discharge area as a function of time and further relative to the engine operative speed curve 150. The afterburner fuel flow curve 154 is shown to represent fuel flow in pounds per hour as a function of time with the beginning of afterburner fuel flow corresponding relative to the speed curve to the time when the afterburner fuel flow is initiated to the afterburner manifold 50 by the afterburner fuel control device 44 (shown in Figure 1). A plurality of dotted upper portions or levels 156, 158, 160 and 162 are shown for the afterburner fuel curve 154, which levels respectively correspond to various and different afterburner settings or scheduling by the control throttle member 54 as shown in Figure 1. It will be noted that when the flow of afterburner fuel to the afterburner nozzles is commenced or initiated there is a slight dip in the engine operative speed curve 150 as illustrated by the dotted curved portions 164 and 166, and which corresponds to the decrease in speed resulting by the initiation of the afterburner fuel flow. The lower dotted speed curve 164 in Figure 2 corresponds to the predetermined lower limit of the speed dip as determined by the stall or surge characteristic of the compressor unit 16. The upper dotted speed curve 166 corresponds to the flameout condition for the gas turbine engine 10 such that if the engine operative speed during the initiation of the afterburner fuel flow is actually above the upper of these curves there may result a flame-out condition which corresponds to an inability to ignite or support combustion of the afterburner fuel within the tailpipe chamber 22.

In the operation of the apparatus shown in Figure 1 the first control valve 65 prevents the passage of control fuel at pressure $P_1$, which corresponds to the outlet pressure of the main fuel pump 36, between the inlet passage 70 and the outlet passage 72 until the throttle control cam 56 is so positioned by the scheduling or setting of the control throttle member 54 to initiate the flow of afterburner fuel to the afterburner manifold 50. In this respect the control throttle member 54 requests the initiation of the afterburner fuel flow which fuel flow does not actually occur until the operative speed of the engine is up to a predetermined minimum value. When the control throttle member 54 schedules the flow of afterburner fuel to the afterburner manifold 50 the throttle control cam 56 is so positioned that the cam follower 60 and the linkage arm 62 move the shuttle valve member 64 to connect the inlet passage 70 to the outlet passage 72 by means of the illustrated annular recess of the shuttle valve member 64. The control fuel at pressure $P_1$ then passes to the second control valve 79 which is operative to prevent the passage of control fuel at pressure $P_1$ from the inlet passage or conduit 76 to the outlet conduit 98 until the operative speed of the engine as sensed by the speed weight 112 reaches a predetermined minimum value.

When the predetermined minimum speed value is attained the servo control valve 96 is closed against its corresponding servo seat such that the servo fluid pressure $P_x$ within the servo control chamber 92 and the fuel chamber 84 is sufficient to overcome the force of the compression spring member 82 and is sufficient to move the shuttle valve member 80 into the position as shown in Figure 1 which allows the control fuel at pressure $P_1$ to pass from the inlet passage 76 to the outlet passage 98. The inlet passage 86 is then additionally opened as shown in Figure 1 such that the control fuel at pressure $P_1$ also enters the fuel chamber 84 to boost the movement of the shuttle valve member 80 and further to lock the shuttle valve member 80 in the position as shown in Figure 1. Until the control fuel at pressure $P_1$ is shut off by the proper scheduling of the control throttle member 54 and the control cam 56 such that the shuttle valve member 64 is positioned to shut off the flow of control fuel at pressure $P_1$ between the inlet passage 70 and the outlet passage 72 of the first control valve 65, the control fuel or fluid at pressure $P_1$ within the fluid chamber 84 is operative to hold or lock the shuttle valve member 80 in the illustrated position regardless of any subsequent changes in the speed of the engine. Regarding the latter described operation the bleed orifice 94 is so designed such that should the operative speed of the engine decrease after the initiation of the afterburner fuel flow, the control fluid at pressure $P_1$ within the fuel chamber 84 remains sufficiently high to lock the shuttle valve member 80 in the position shown in Figure 1 regardless of any changes in the servo pressure $P_x$ of control fluid within the servo chamber 92. In actual practice this arrangement is provided since the light off or start of afterburning operation momentarily drops the operative speed of the gas turbine engine as shown by the speed curve 150 of Figure 2, and this change of speed would be operative through the servo control valve 96 to change the pressure of the control fluid within the servo chamber 92. With the shuttle valve 80 in the position shown in Figure 1 the control fluid at pressure $P_1$ passes from the outlet conduit 98 to the inlet conduit 102 of the third control valve 101, and causes the piston member 103 to move against the force of compression spring member 105 to open the control valve 107 to control the supply of fuel to the centrifugal type afterburner fuel pump 48 from the fuel supply conduit 111. Thusly, when the control fuel at pressure $P_1$ enters the outlet fuel conduit 98 the piston 103 is moved against the force of the compression spring member 105 to permit the supply of control fuel to the afterburner fuel pump 48 and through the afterburner fuel control device 44 to the afterburner manifold 50. The afterburner fuel pump 48 is of the centrifugal type which operates with or without a supply of fuel when the engine is operative, such that until the control fuel at pressure $P_1$ is supplied to the inlet passage 102 the afterburner fuel pump 48 runs dry or without a supply of afterburner fuel.

Should the setting of the control throttle member 54 now be changed such that the flow of afterburner fuel to the afterburner manifold 50 is no longer desired, the first control valve 65 closes to prevent the passage of control fuel at pressure $P_1$ from the inlet passage 70 to the outlet passage 72. This in turn shuts off the flow of control fuel at pressure $P_1$ to the inlet conduit 76 and inlet conduit 86 of the second control valve 79, such that the force of the compression spring 82 is now sufficient to move the shuttle valve 80 to its lower position where the inlet passage 86 is closed and the outlet passage 98 is closed. This in turn opens the outlet passage 100 such that control fuel at pressure $P_0$ enters from the fuel conduit 110 to the inlet conduit 108 of the second control valve 79 and out through the outlet conduit 100 to the inlet conduit or passage 102 of the third control valve 101. This control fuel at pressure $P_0$ is not sufficient to overcome the force of the compression spring member 105 such that the control valve member 107 is moved to cut off or stop the supply of afterburner fuel to the afterburner fuel pump 48 from the fuel supply conduit 111.

In the operation of the speed piston 129 the output of the speed weight 112 is so applied to the control lever 116 during an increase in engine speed as to close the servo control valve 120 to increase the fluid pressure within the control chamber 122. This causes the speed piston 129 to raise or move against the force of the compression spring member 130. As the speed piston 129 so moves it pushes through the compression spring member 130 against the output of the speed weight 112 such that in actual practice the speed weight 112 returns to approximately its original position but the outlet force of the speed weight 112 is represented by a corresponding compression of the compression spring 130 to thereby load the compression spring 130 as a function of the output of the speed weight 112. Therefore the movement or stroke of the speed piston 129 is approximately equal to or is a function of the output force of the speed weight 112 which in turn is a function of the square of engine operative speed. The adjustable connection 140 supporting the follower link member 136 is operative to adjust the predetermined speed level at which the control servo valve 96 closes to thereby control the predetermined operative speed at which the shuttle valve 80 of the second control valve 79 opens to allow the passage of control fuel at pressure $P_1$ from the inlet conduit 76 to the outlet conduit 98.

Although only a preferred embodiment of the present invention has been schematically illustrated and described it will be apparent to those skilled in the art that various changes in the structure and relative arrangement of parts may be made to suit individual requirements without departing from the scope and spirit of the present invention.

I claim:

1. Fuel control apparatus for use with an engine having an afterburner combustion section, the combination of a first conduit for supplying fuel to said afterburner combustion section, an afterburner fuel control operative with said first conduit for controlling the rate of fuel flow therethrough, a control valve member disposed in said first conduit and having a first position for preventing the flow of fuel to said afterburner control and a second position for permitting the flow of fuel to said afterburner control, said control valve member being responsive to fluid pressure such that said control valve member is positioned from said first to said second position when pressurized fluid is supplied thereto, a pressurized fluid source, a second conduit interconnecting said source and said control valve member for supplying a pressurized fluid thereto, first and second valves arranged in series flow relationship in said second conduit each having a flow permitting and a flow preventing position, an engine throttle control means operatively connected to said first valve to control the position thereof, and means responsive to engine speed connected to said second valve for controlling the position thereof.

2. Fuel control apparatus as claimed in claim 1 wherein said means responsive to engine speed is comprised of a rotating flyweight member, a servo operated piston controlled in position by said flyweight member, and lever means interconnecting said servo operated piston and said second valve such that said second valve is actuated when said servo piston obtains a predetermined position and said engine speed obtains a predetermined value.

3. Fuel control apparatus as claimed in claim 1 wherein said engine throttle control means includes a manually rotatively positionable shaft member, a cam member secured to said shaft for rotation therewith, and a cam follower formed integrally with said first valve and in contactive engagement with said cam member such that reciprocating movement is imparted to said first valve in response to rotative movement of said cam member.

4. Fuel control apparatus as claimed in claim 1 wherein said control valve member and said first and second valves all include resilient means urging said valve member and said valves in their respective flow preventing positions.

5. Fuel control apparatus as claimed in claim 1 including means fluidly actuated when said second valve moves to its said flow permitting position operative to lock said second valve in its said flow permitting position.

6. Fuel control apparatus as claimed in claim 2 wherein said servo operated piston includes a cam surface formed thereon, and said lever means is in contactive engagement with said cam surface over at least a portion of its operating range.

References Cited in the file of this patent

UNITED STATES PATENTS

| 765,561 | Crowe | July 19, 1904 |
| 2,020,847 | Mitereff | Nov. 12, 1935 |
| 2,207,806 | Hollmann | July 16, 1940 |
| 2,429,189 | Maddox | Oct. 14, 1947 |
| 2,498,939 | Bobier | Feb. 28, 1950 |
| 2,557,526 | Bobier et al. | June 19, 1951 |
| 2,658,566 | Wirth et al. | Nov. 10, 1953 |
| 2,685,334 | Davies | Aug. 3, 1954 |
| 2,699,316 | Mosher | Jan. 11, 1955 |
| 2,699,524 | Jackson et al. | Jan. 11, 1955 |
| 2,789,417 | Kuzmitz | Apr. 23, 1957 |
| 2,869,565 | Cliborn | Jan. 20, 1959 |